Aug. 6, 1957  L. F. KENDALL  2,801,459
GEAR SHAPER CUTTER
Filed March 15, 1954  2 Sheets-Sheet 1

INVENTOR.
LLOYD F. KENDALL.
BY John Morton
HIS ATTORNEY

Aug. 6, 1957 L. F. KENDALL 2,801,459
GEAR SHAPER CUTTER
Filed March 15, 1954 2 Sheets-Sheet 2
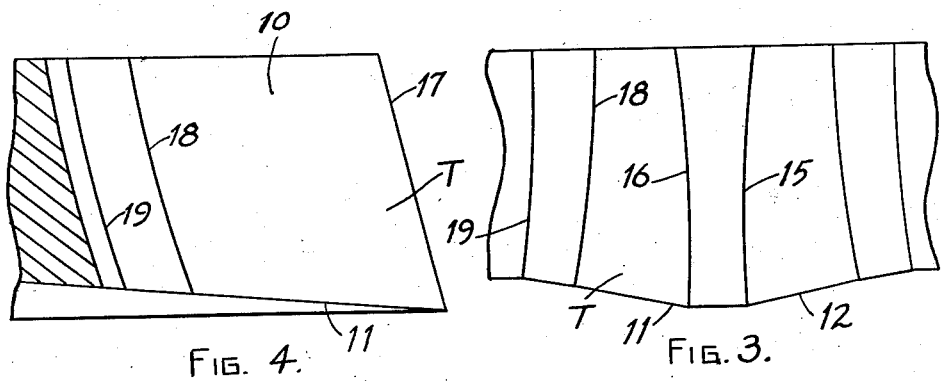
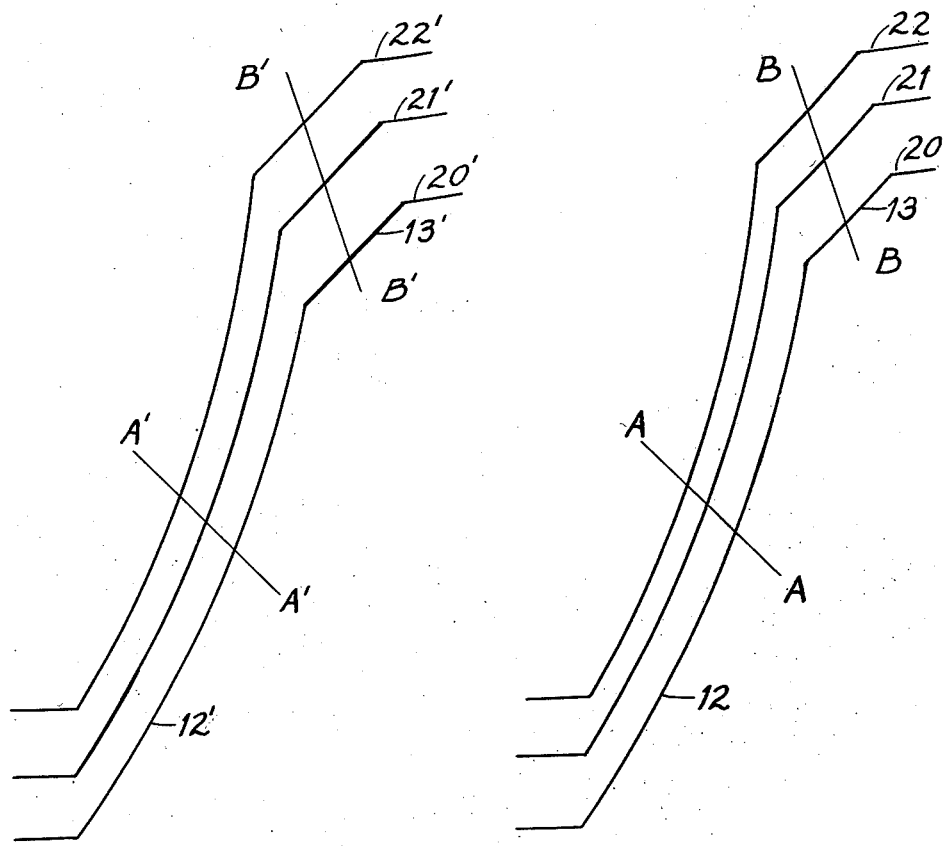
INVENTOR.
LLOYD F. KENDALL.
BY John Morton
HIS ATTORNEY

United States Patent Office 2,801,459
Patented Aug. 6, 1957

2,801,459

GEAR SHAPER CUTTER

Lloyd F. Kendall, Springfield, Vt., assignor to The Fellows Gear Shaper Company, Springfield, Vt., a corporation of Vermont Application March 15, 1954, Serial No. 416,282

5 Claims. (Cl. 29—95)

The present invention relates to gear shaper cutters of the well-known Fellows type and particularly such cutters as are formed so as to chamfer the teeth of a gear when the gear is being cut. Such cutters are of the type exemplified in the U. S. patent to E. W. Miller No. 1,610,571, issued December 14, 1926.

As is well known such cutters have teeth thereon which teeth are conjugate to the teeth to be formed on the work piece. In order to provide cutting clearance for the teeth of the cutter they are backed off, that is inclined inwardly and the sides are inclined toward one another. When the cutter becomes dulled by use, it is sharpened by grinding the leading face or end face at the large end of the cutter.

Cutters of the type herein concerned which are to chamfer the work teeth simultaneously with the cutting thereof are modified by leaving the cutter teeth wider at their inner ends or at their roots than they would be if they followed a true face curvature. Such true face curvature in present day practice would usually be an involute curve and will be hereinafter referred to as an involute although other face curvatures could be employed and I do not intend to be limited in my application to an involute otherwise than is set forth in the claims hereof.

It has been found that when cutters are made as described above and sharpened back that there is a dislocation of the chamfering portion of the cutter tooth with respect to the other tooth parts such as tooth thickness and the like at mean cutter life. This is undesirable since when the center distance between cutter and work is made smaller to compensate for the change in size of the cutter after sharpening so as to produce gears of the same pitch and tooth proportions the amount of chamfer produced on such gears will vary.

The present invention is concerned with a manner of manufacturing a gear shaper cutter which is modified to produce gears with a chamfer on the teeth thereof and in which the position of the modified portion of the cutter tooth will remain in substantially the same relative position throughout repeated sharpenings of the cutter. By maintaining the modified portion of the cutter tooth in the same relative position with respect to the side face curves of the cutter teeth when the cutter is sharpened back it is possible to effectively use the cutter throughout many more sharpenings and therefore through a much longer useful life.

Since it is now standard practice to use modified or chamfered gears to obtain practically quiet operating gear trains and since it is important to accurately control the amount of chamfer on the gear if the desired conditions are to be maintained it is highly desirable that the cutter used to produce the gears retain its tooth proportions throughout its useful life. The problem of maintaining the relative positions of chamfering or modifying portion and tooth curves is solved by producing a gear shaper cutter which is backed off in a novel manner as set forth below.

Therefore the primary object of the invention herein concerned is to provide a cutter which will maintain the position of the chamfer produced on the work in the same location with respect to the other tooth parts on said work throughout the useful life of the cutter and without regard to number of sharpenings undergone by the cutter within its useful life.

In the drawings:

Figure 3 is a view of a tooth of the cutter of the present invention looking inwardly thereon in the direction of the arrows 3—3 of Fig. 1;

Figure 4 is a side view of a tooth of the cutter of the present invention looking in the direction of the arrows 4—4 of Fig. 1;

Figure 5 is a view showing diagrammatically three different positions of the cutting edge of the cutter herein concerned through three successive sharpenings and;

Figure 6 is a similar view showing diagrammatically a conventional type cutter with its cutting edges in three similar positions after similar sharpenings.

Like reference characters designate the same elements wherever they occur in all the figures.

Figure 1:
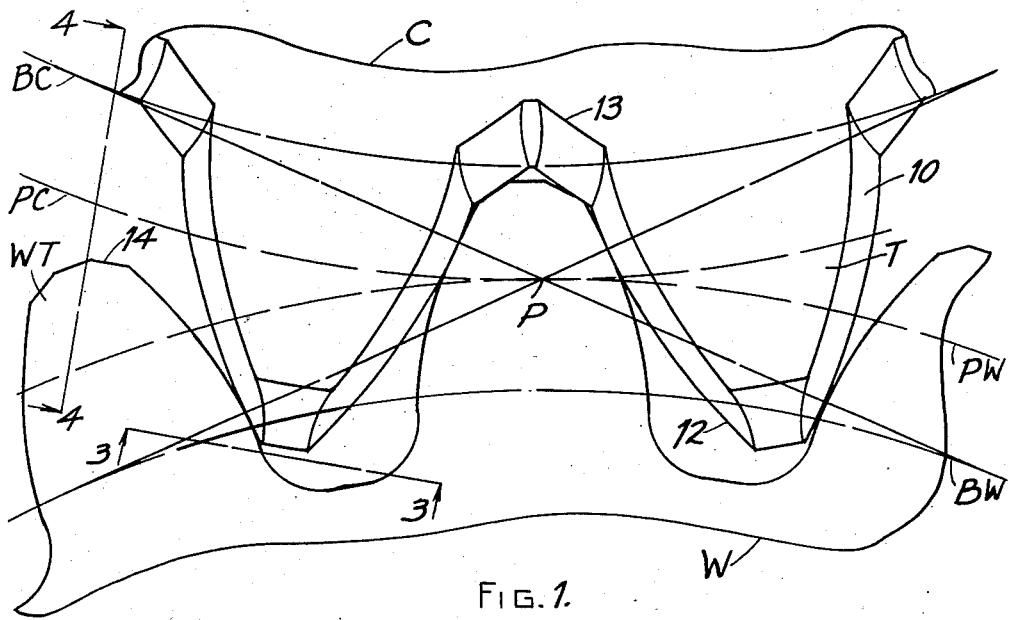
Figure 1 is a plan view of a fragment of a gear shaper cutter of the present invention prior to any sharpening in mesh with a fragment of a work piece in operative relation with the cutter.

As shown in Fig. 1 the gear shaper cutter C has cutting teeth T formed thereon. These teeth T have side faces 10, and the intersection of these side faces 10 with the leading face 11 forms the cutting edges 12. The face curves of the side faces 10 are generated from a base circle BC. The teeth T have chamfering portions 13 which diverge from the side faces and these portions 13 when the cutter is rotated in harmony with the work will form the desired chamfer on the teeth of the work. Such chamfer on the work teeth WT is shown at 14 in Figs. 1 and 2.

As is well known in the art the cutter C is reciprocated in the direction of its axis relative to the work piece W and at the same time both cutter and work are rotated harmoniously so as to obtain what is known as a molding generating action which action is similar to that obtained by rolling two gears in mesh with each other.

As shown in Fig. 1 in the present illustration the teeth on the work are generated from a base circle BW. During the generating action the cutter and work roll on pitch circles PC and PW respectively which meet at the pitch point P.

Figure 2:
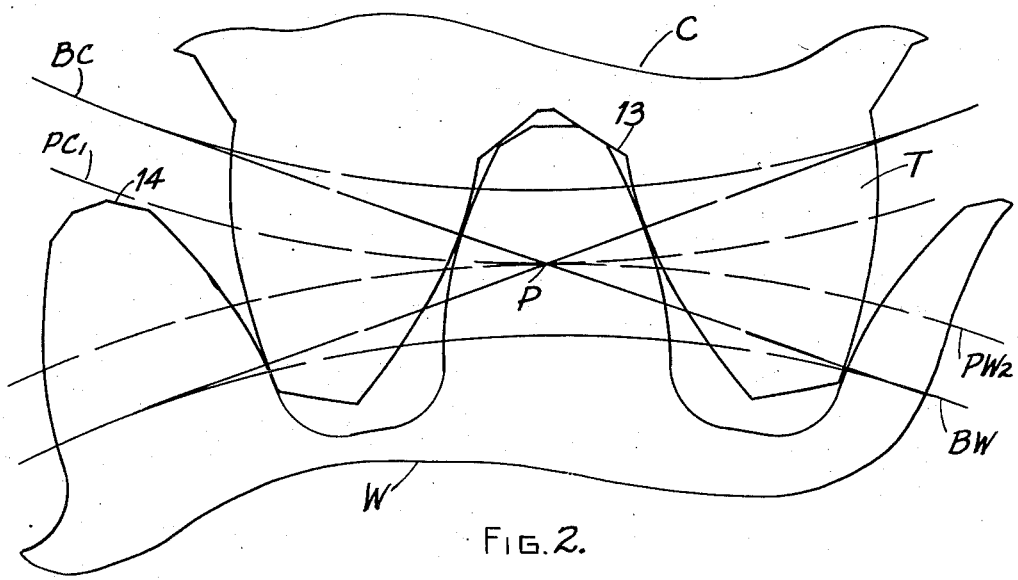
Figure 2 is a plan view of the same cutter after repeated sharpenings and after the cutter has had its life substantially expended, with a similar work piece in operative relation thereto.

Shown in Fig. 2 is a Gear Shaper cutter C after it has undergone several sharpenings and has reached the limit of its useful life. It will be noted that the cutter C has been fed into the work to compensate for the reduction in width of the cutting teeth T thus making it possible to obtain the desired width of tooth on the work. This depth feed is evidenced by the reduced distance between base circles BC and BW along the line of centers of cutter and work. However, with my invention, even under such conditions the amount of chamfer 14 obtained on the work is substantially the same as that obtained under the conditions illustrated in Figure 1 as a result of the formation of the teeth of the cutter in the manner described below.

In order to more clearly point out the advantages of the cutter of the present invention reference will be made to the inherent problems of a conventional cutter which is backed off along straight lines by inclining the side faces of the teeth inwardly and toward one another.

from the leading face of the cutter toward the trailing face.

In Figure 6 is a diagrammatic view of a portion of the cutting edges of such a conventional type cutter. Line 20' represents the cutting edge of a cutter when it is new, line 21' represents the cutting edge at mean life of the cutter and line 22' represents the cutting edge of the same cutter after it has been repeatedly ground back and reached the limit of its life. This sharpening is done, as has been set forth above, by grinding the leading face 11 of the cutter.

Figure 6 shows how the relative position of the chamfering portion 13' and cutting edge 12' changes as a result of sharpenings of a conventional type of gear shaper cutter. It will be seen that at half-life of the cutter on the involute portion 12' of the cutting tooth as designated on the line A'—A' the distance between the lines 20' and 21' is substantially equal to the distance between lines 21' and 22'. However, at the chamfering portion 13' as designated at line B'—B' the distance between lines 20' and 21' is substantially greater than the distance between lines 21' and 22' signifying that the relative positions of cutting edges 12' and 13' have changed so that the cutter will not produce a gear with the same amount of chamfer after sharpening as the cutter did when new. Thus since most gearing and particularly automotive gearing is designed with a certain amount of chamfer placed specifically with respect to the side faces of the gear tooth to obtain the quietest practical action possible any deviation from the predetermined position is detrimental and not desired.

The novel formation of the teeth T of my cutter which remedies this defect is clearly shown in Figures 3 and 4. As shown in these figures the front face 11 is formed in the conventional manner. The side faces 10, however, instead of being relieved along the usual straight lines are given a concave configuration as shown by the elements 15 and 16 which are the end elements of side faces 10. These faces are made up of a series of curved elements extending from the outer surface 17 of the tooth T inwardly to the root portion 18. The root or chamfering portion 13 is also curved or concaved as shown at 18 and 19.

The curved elements which go to make up the side faces and chamfering surfaces are actually concaved in two directions, namely, lengthwise of the teeth T and in the direction of the width and depth of said teeth as is readily apparent from an inspection of Figures 3 and 4.

As shown in Figure 5, which is similar to Figure 6, the concave relief of the gear shaper cutter teeth T results in the maintenance of the same relative position of cutting edge 12 and chamfering portion 13. The line 20 represents the combined cutting edge made up of portion 12 and portion 13 of the tooth T when new, line 21 represents the cutting edge at half life and line 22 the cutting edge at the end of the useful life of the cutter in a manner similar to that shown in Figure 6.

I have found that while with this concave type of sharpening the distance between line 20 and 21 at half life along line A—A will be greater than the distance between lines 21 and 22 in a similar manner, the distance between 20 and 21 at position B—B will also be greater than that between lines 21 and 22. The relation of these distances remains proportional throughout the life of the cutter and at all positions along the cutting edge including, of course, the part of the cutting edge which lies at the chamfering portion 13 which forms the chamfer 14 on the gear W.

As a result of this maintenance of ratios between the position of cutting edge 12 and chamfering portion 13 the cutter C will produce the same amount of chamfer located in the same position with respect to the other parts of the tooth curves produced on the work throughout the useful life of the cutter. That is after the cutter C has been sharpened by the grinding of the leading face 11 the teeth T are thinned as is well-known in the art. To compensate for this thinning the cutter C must be fed radially of the work W in the manner shown in Figure 2. When this occurs with the cutter C backed off according to the teaching of this invention the distance that the cutting portion 13 is moved will be proportional to the movement of cutting edge 12.

While I have shown a chamfer 14 which is relatively straight other types of modification may of course be employed depending on the type of chamfer which is to be produced on the gear. In any case with a cutter backed off in the manner of the present invention the chamfer produced on the gear will be of the same amount and in the same relation to the remaining tooth parts produced on the work throughout the life of the cutter.

What I claim is:

1. A gear shaper cutter of the character described, having a leading face and a trailing face, cutting teeth formed on said cutter, said cutting teeth having side faces extending between said leading and trailing faces, said teeth having cutting edges formed at the intersection of said leading face and said side faces, said side faces being of concave configuration, said side faces in planes perpendicular to the axis of the cutter being curves of standard form and said side faces diverging outwardly from the continuation of said curves of standard form and from the radial direction in approaching the root of the tooth to form chamfering portions, the curvature of said side faces being such that in successive planes rearwardly of said leading face and perpendicular to the axis of said cutter the displacement inwardly of said side faces of standard form from said leading face is substantially in proportion to the displacement inwardly from said leading face of said outwardly diverging chamfering portions of said side faces.

2. A gear shaper cutter of the character described, having a leading face and a trailing face, cutting teeth formed on said cutter, said cutting teeth having side faces extending between said leading and trailing faces, said teeth having cutting edges formed at the intersection of said leading face and said side faces, said side faces being of concave configuration in the direction of the axis of the cutter, said side faces in planes perpendicular to the axis of the cutter being curves of standard form and said side faces diverging outwardly from the continuation of said curves of standard form and from the radial direction in approaching the root of the tooth to form chamfering portions, the curvature of said side faces being such that in successive planes rearwardly of said leading face and perpendicular to the axis of said cutter the displacement inwardly of said side faces of standard form from said leading face is substantially in proportion to the displacement inwardly from said leading face of said outwardly diverging chamfering portions of said side faces.

3. A gear shaper cutter of the character described, having a leading face and a trailing face, cutting teeth formed on said cutter, said cutting teeth having side faces extending between said leading and trailing faces, said teeth having cutting edges formed at the intersection of said leading face and said side faces, said side faces being of concave configuration, said side faces in planes perpendicular to the axis of the cutter being curves of involute form generated from the same base circle and said side faces diverging outwardly from the continuation of said curves of involute form and from the radial direction in approaching the root of the tooth to form chamfering portions, the curvature of said side faces being such that in successive planes rearwardly of said leading face and perpendicular to the axis of said cutter the displacement inwardly of said side faces of involute form from said leading face is substantially in proportion to the displacement inwardly from said leading face of said outwardly diverging chamfering portions of said side faces.

4. A gear shaper cutter of the character described, having a leading face and a trailing face, cutting teeth formed on said cutter, said cutting teeth having side faces extending between said leading and trailing faces, said teeth having cutting edges formed at the intersection of said leading face and said side faces, said side faces being of concave configuration in the direction of the axis of said cutter, said side faces in planes perpendicular to the axis of the cutter being curves of involute form generated from the same base circle and said side faces diverging outwardly from the continuation of said curves of involute form and from the radial direction in approaching the root of the tooth to form chamfering portions, the curvature of said side faces being such that in successive planes rearwardly of said leading face and perpendicular to the axis of said cutter the displacement inwardly of said side faces of involute form from said leading face is substantially in proportion to the displacement inwardly from said leading face of said outwardly diverging chamfering portions of said side faces.

5. A gear shaper cutter of the character described, having a leading face and a trailing face, cutting teeth formed on said cutter, said cutting teeth having side faces extending between said leading and trailing faces, said teeth having cutting edges formed at the intersection of said leading face and said side faces, said side faces being of concave configuration, said side faces in planes perpendicular to the axis of the cutter being curves of standard form and said side faces having a portion thereof diverging outwardly from the continuation of said curves of standard form and from the radial direction to form chamfering portions, the curvature of said side faces being such that in successive planes rearwardly of said leading face and perpendicular to the axis of said cutter the displacement inwardly of said side faces of standard form from said leading face is substantially in proportion to the displacement inwardly from said leading face of said outwardly diverging chamfering portions of said side faces.

References Cited in the file of this patent
UNITED STATES PATENTS

| | | |
|---|---|---|
| 676,226 | Fellows | June 11, 1901 |
| 1,610,571 | Miller | Dec. 14, 1926 |
| 1,892,091 | Wildhaber | Dec. 27, 1932 |
| 2,248,168 | Gleason | July 8, 1941 |

OTHER REFERENCES

Publication: Gear Cutting Practice, by Fred H. Colvin and Frank A. Stanley, published by McGraw-Hill Book Co., Inc., 1937.